United States Patent [19]
Thackeray et al.

[11] Patent Number: 5,658,693
[45] Date of Patent: Aug. 19, 1997

[54] MANGANESE DIOXIDE-BASED MATERIAL

[75] Inventors: Michael Makepeace Thackeray; Margaretha Hendrina Rossouw, both of Pretoria, South Africa

[73] Assignee: Technology Finance Corporation (Proprietary) Limited, South Africa

[21] Appl. No.: 391,072

[22] Filed: Feb. 17, 1995

Related U.S. Application Data

[63] Continuation of Ser. No. 878,620, May 5, 1992, abandoned.

[30] Foreign Application Priority Data

Jun. 17, 1991 [ZA] South Africa ............ 91/4622
Oct. 16, 1991 [ZA] South Africa ............ 91/8247

[51] Int. Cl.$^6$ .................................................. H01M 4/50
[52] U.S. Cl. ..................... 429/224; 423/599; 423/641
[58] Field of Search ........................... 423/599, 641; 429/224

[56] References Cited

U.S. PATENT DOCUMENTS

| | | | |
|---|---|---|---|
| 4,277,360 | 7/1981 | Mellors et al. | 429/224 |
| 4,312,930 | 1/1982 | Hunter | 429/191 |
| 4,405,699 | 9/1983 | Kruger | 429/224 |
| 4,476,104 | 10/1984 | Mellors . | |

FOREIGN PATENT DOCUMENTS

| | | |
|---|---|---|
| 1320045 | 6/1973 | United Kingdom . |
| 2160854 | 1/1989 | United Kingdom . |

OTHER PUBLICATIONS

CA 118:91268, Pannetier, 1992.
Handbook of Mangase Dioxide Battery Grade pp. 176–198, 1989.
Glover, D., et al; "Handbook of Manganese Dioxides Battery Grade" Int'l Battery Materials Ass'n (IBN, Inc.) 1989; pp. 176–198.

*Primary Examiner*—M. Nuzzolillo
*Attorney, Agent, or Firm*—Londa and Traub

[57] ABSTRACT

The invention provides a manganese dioxide-based material which is highly crystalline and chemically prepared. The material has a predominantly ramsdellite structure, and has a powder X-ray diffraction pattern (CuK$_\alpha$ radiation) in which the ratio of a [110] peak height to a [201] peak height is at least 0,6:1,0. The material can be used as an electrode material in an electrochemical cell 10.

9 Claims, 13 Drawing Sheets

MANGANESE DIOXIDE-BASED MATERIAL

This application is a continuation of application Ser. No. 07/878,620, filed May 5, 1992, now abandoned.

BACKGROUND OF THE INVENTION

THIS INVENTION relates to a manganese dioxide-based material. It relates also to an electrochemical cell incorporating the material.

According to a first aspect of the invention, there is provided a manganese dioxide-based material which is highly crystalline, chemically prepared, has a predominantly ramsdellite structure, and has a powder X-ray diffraction pattern ($CuK_\alpha$ radiation) in which the ratio of a [110] peak height to a [201] peak height is at least 0.6:1.0.

The material will be used primarily in electrochemical applications, typically as an electrode material in an electrochemical cell having an electrochemically conducting anode, an electrochemically conducting cathode, and an electrochemically insulating electrolyte separating the anode from the cathode.

The material can hence be used as a positive electrode or cathode material in a cell having aqueous or non-aqueous electrolytes, for example those employing a zinc or lithium anode or negative electrode, respectively. It is believed that it will find particular, but not necessarily exclusive, application as positive electrode material in primary or rechargeable lithium cells.

The material may also comprise a minor proportion of $\beta$-$MnO_2$, ie $MnO_2$ having a rutile structure, as an intergrowth in combination with the predominantly ramsdellite structure.

The material may further comprise a minor proportion of lithium or hydrogen to stabilize the ramsdellite structure. In this regard, the ramsdellite-$MnO_2$ need not necessarily be a stoichiometric compound in which the Mn:O ratio is 1:2 so that the oxidation state of the manganese ions is 4.0, but may be one in which the Mn:O ratio deviates slightly from 1:2 such that the oxidation state of the manganese ions is less than 4.0 but greater than 3.8 preferably greater than 3.8.

In the powder X-ray diffraction pattern, the ratio of the [110] peak height to the [201] peak height may be at least 0.8:1.0, typically about 1.0:1.0, which indicates a high degree of crystallinity and single-phase character of the ramsdellite manganese dioxide structure. The [110] peak may occur at about 22°2θ, while the [201] peak may occur at about 37°2θ. In the powder X-ray diffraction pattern, the ratio of the [110] peak height to a [221] peak height, which may occur at about 56°2θ may be at least 1.2:1.0, also indicating the high degree of crystallinity of the ramsdellite manganese dioxide structure. The ratio of the [110] peak height to the [221] peak height may be about 1.4:1.0. The [110] peak may have a peak width, at half the peak height, of less than 2°2θ, eg about 1.5°2θ, which further indicates the high degree of crystallinity of the ramsdellite manganese dioxide structure.

The material may be prepared by reacting a lithium-manganese-oxide compound with concentrated acid. The acid may be sulphuric acid, and its concentration may be at least 2M. It has been found that the use of concentrated acid to digest the lithium-manganese-oxide compound, results in a highly crystalline ramsdellite-$MnO_2$ structure being synthesized. It is believed that an advantage of the high degree of crystallinity in the ramsdellite structure or phase is that the structural integrity of the ramsdellite-$MnO_2$ structure on cycling in rechargeable Li/ramsdellite-$MnO_2$ electrochemical cells may be superior to that obtained from known $\gamma$-$MnO_2$ electrodes, such as electrolytically prepared $MnO_2$ ('EMD'). A further advantage of the ramsdellite-$MnO_2$ structure is that it may offer a higher initial discharge capacity for primary cell applications compared to known chemically prepared $MnO_2$ ('CMD') materials and EMD products.

The lithium-manganese-oxide precursor compound may be selected from stoichiometric spinel compounds such as $LiMn_2O_4$, or defect spinel compounds such as those found in the system $Li_2O.yMnO_2$, for example, $Li_2Mn_4O_9$ (y=4) or $Li_2Mn_3O_7$ (y=3).

These precursor compounds can typically be synthesized by reaction of manganese carbonate, $MnCO_3$, and lithium carbonate, $Li_2CO_3$, in the required ratios and at predetermined temperatures, for example

| | | |
|---|---|---|
| $Li_2CO_3 + 4MnCO_3$ | 800° C. → air | $2LiMn_2O_4 + 5CO_2$ |
| $Li_2CO_3 + 4MnCO_3$ | ~400° C. → air | $Li_2Mn_4O_9 + 5CO_2$ |
| $Li_2CO_3 + 3MnCO_3$ | ~400° C. → air | $Li_2Mn_3O_7 + 4CO_2$ |

The lithium-manganese-oxide spinel precursor compounds may be digested in concentrated sulphuric acid, for example, 2.6M $H_2SO_4$, at elevated temperature, for example, at about 95° C., for several hours, to leach out effectively all the lithium and to generate the highly crystalline ramsdellite-$MnO_2$ phase. For example, when taken to completion the ideal reactions can be represented by

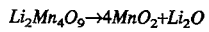

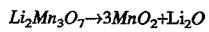

It should be noted, however, that in practice the final ramsdellite phase may contain a small amount of lithium or hydrogen which, it is believed, may serve to stabilize the structure.

The ramsdellite-$MnO_2$ phase when made by the method according to the invention will usually contain a small amount of water that is normally associated with the surface of the $MnO_2$ particles or with grain boundaries. This water content is important when the ramsdellite-$MnO_2$ is to be used as an electrode in aqueous cells, for example, those using zinc anodes. However, when it is to be used in lithium cells, the ramsdellite-$MnO_2$ phase must be heated to 100° C. or higher to remove water therefrom. In this respect the ramsdellite-$MnO_2$ phase of the present invention has been found to be remarkably stable to 250°–300° C.; however heat-treatment above 300° C. causes a transformation to a $\beta$-$MnO_2$(rutile-type) structure.

Instead, the ramsdellite-$MnO_2$ phase may be dehydrated at elevated temperature, eg 200°–400° C., preferably 300°–370° C., in the presence of a lithium salt such as LiOH, $LiNO_3$ or $Li_2CO_3$, to generate lithium-stabilized ramsdellite phases, optionally in the presence of additional lithium manganese-oxide phases such as spinel phases that may be produced as a by-product of the reaction. Although the exact compositional range of these phases has not been determined, it is believed that the overall composition can be represented by $Li_{2x}MnO_{2+x}$ with $0 \leq x \leq 0.2$. It should also be noted that the $MnO_2$ component in the $Li_{2x}MnO_{2+x}$ ramsdellite-related phases need not be stoichiometric, but can be slightly oxygen deficient such that the oxidation state of the manganese cations is slightly less than 4.0.

While the material has been described as being suitable for use as an electrode material, it is believed that it can also be used in catalytic applications.

According to a second aspect of the invention there is provided a manganese dioxide-based material which is highly crystalline, has a predominantly ramsdellite structure, and has a powder X-ray diffraction pattern ($CuK_\alpha$ radiation) in which the ratio of a [110] peak height to a [201] peak height is at least 0.6:1.0 and in which the [110] peak has a peak width, at half the peak height, of less than 2°2θ.

The material according to the second aspect of the invention may also be chemically prepared as hereinbefore described, and may have relative peak heights and peak widths as hereinbefore described.

According to a third aspect of the invention, there is provided an electrochemical cell, which comprises an electronically conducting anode;

an electronically conducting cathode comprising a highly crystalline, chemically prepared, manganese dioxide having a predominantly ramsdellite structure and having a powder X-ray diffraction pattern ($CuK_\alpha$ radiation) in which the ratio of a [110] peak height to a [201] peak height is at least 0.6:1.0; and an electronically insulating electrolyte separating the anode from the cathode.

The cell may be a primary or a secondary, ie rechargeable, cell, and the electrolyte may be aqueous or non-aqueous with the anode then, for example, being zinc or hydrogen, in the case of an aqueous electrolyte, or lithium in the case of a non-aqueous electrolyte.

According to a fourth aspect of the invention, there is provided an electrochemical cell, which comprises an electronically conducting anode;

an electronically conducting cathode comprising a highly crystalline manganese dioxide having a predominantly ramsdellite structure and having a powder X-ray diffraction pattern ($CuK_\alpha$ radiation) in which the ratio of a [110] peak height to a [201] peak-is at least 0.6:1.0 and in which the [110] peak has a peak width, at half the peak height, of less than 2°2θ; and an electronically insulating electrolyte separating the anode from the cathode.

The manganese dioxide may be as hereinbefore described, and in particular may have a powder X-ray diffraction pattern as hereinbefore described.

BRIEF DESCRIPTION OF THE DRAWINGS

The invention is hereinafter described with reference to the following drawings.

SUMMARY OF THE INVENTION

Figure 1:
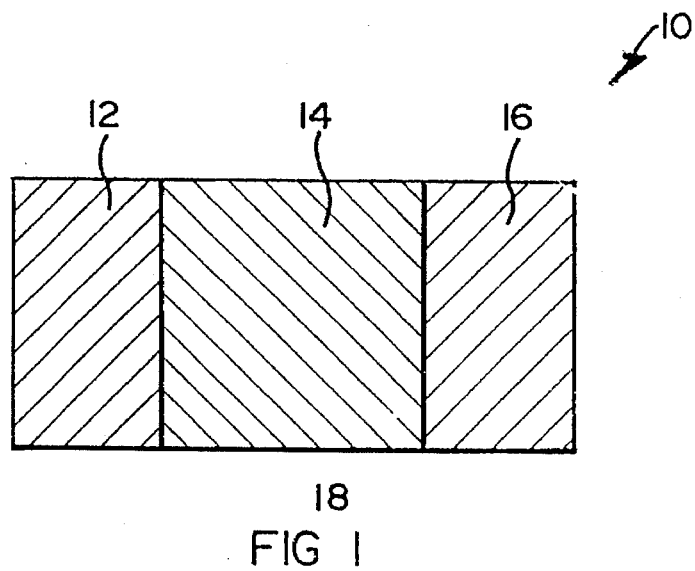
FIG. 1 shows a schematic representation of a cell according to the invention.

The invention will now be described with reference to the following illustrative Examples of electrode materials and cells in accordance with the invention, and with reference to the accompanying diagrammatic drawing (FIG. 1) which shows a schematic representation of a cell according to the invention.

In the drawing is shown a cell of the type Li(anode)/1 molar $LiClO_4$ in propylene carbonate (electrolyte)/ ramsdellite-$MnO_2$, Teflon, acetylene black (cathode). The cell is designated 10 and the anode, electrolyte, and cathode are respectively designated 12, 14 and 16. The anode, electrolyte and cathode are contained in an insulating housing 18 with the anode separated from the cathode by the electrolyte, and suitable terminals (not shown) are in electronic contact respectively with the anode and cathode.

In the cathode, the Teflon is a binder, and the acetylene black is a current collector. The ramsdellite-$MnO_2$ in powder form is mixed in a mass proportion of 70–80% $MnO_2$ with 30–20% Teflon and acetylene black, with the Teflon and acetylene black being in a mass ratio of 1:2, and compacted at 5–10 MPa.

Ramsdellite-$MnO_2$, suitable for use in the cathode 16 of the cell 10, was prepared in accordance with the following Examples:

DETAILED DESCRIPTION OF THE INVENTION

Example 1

Figure 2:
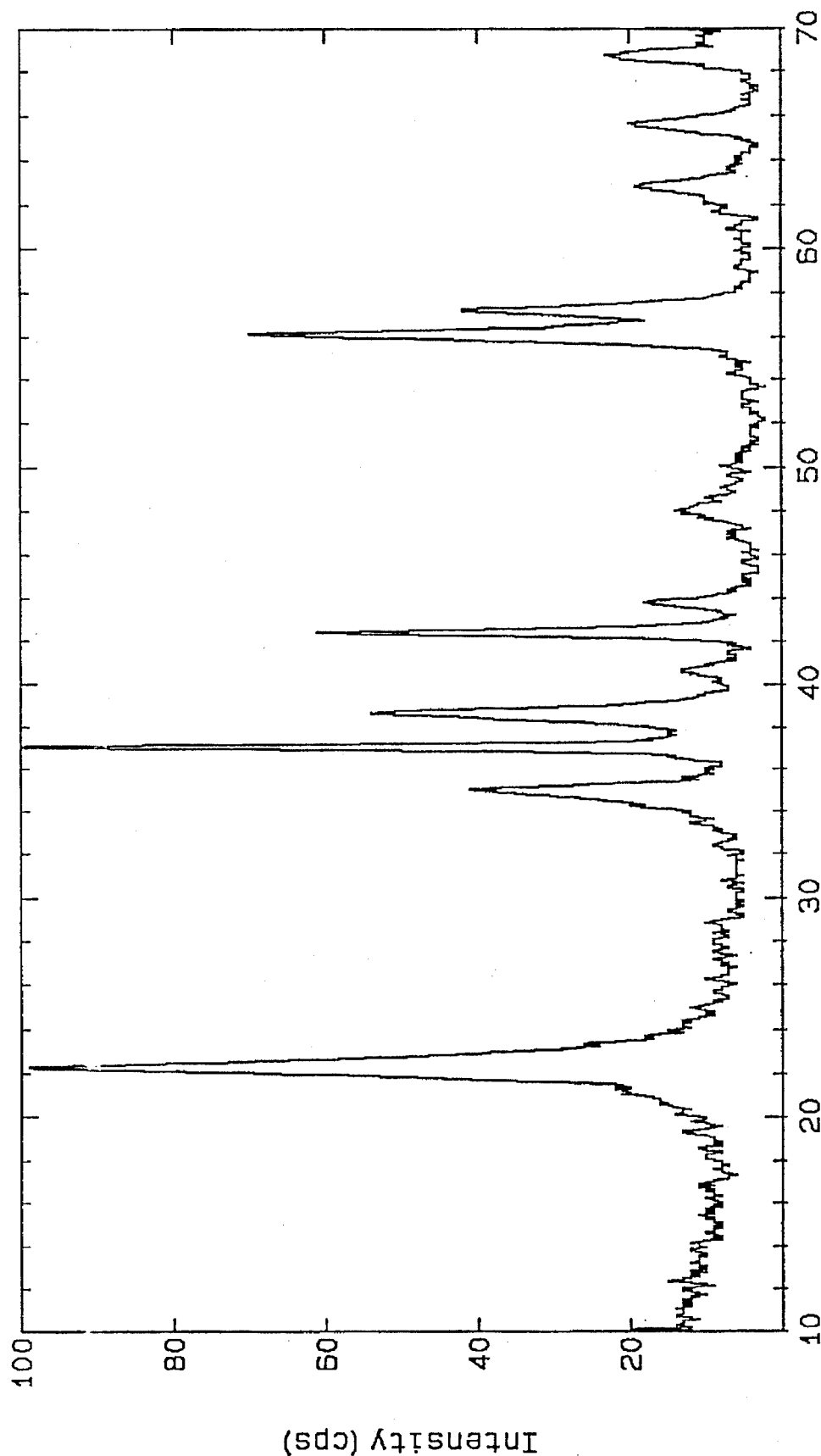
FIG. 2 shows the powder x-ray diffraction pattern of a ramsdellite-$MnO_2$ product according to the invention.
Figure 3:
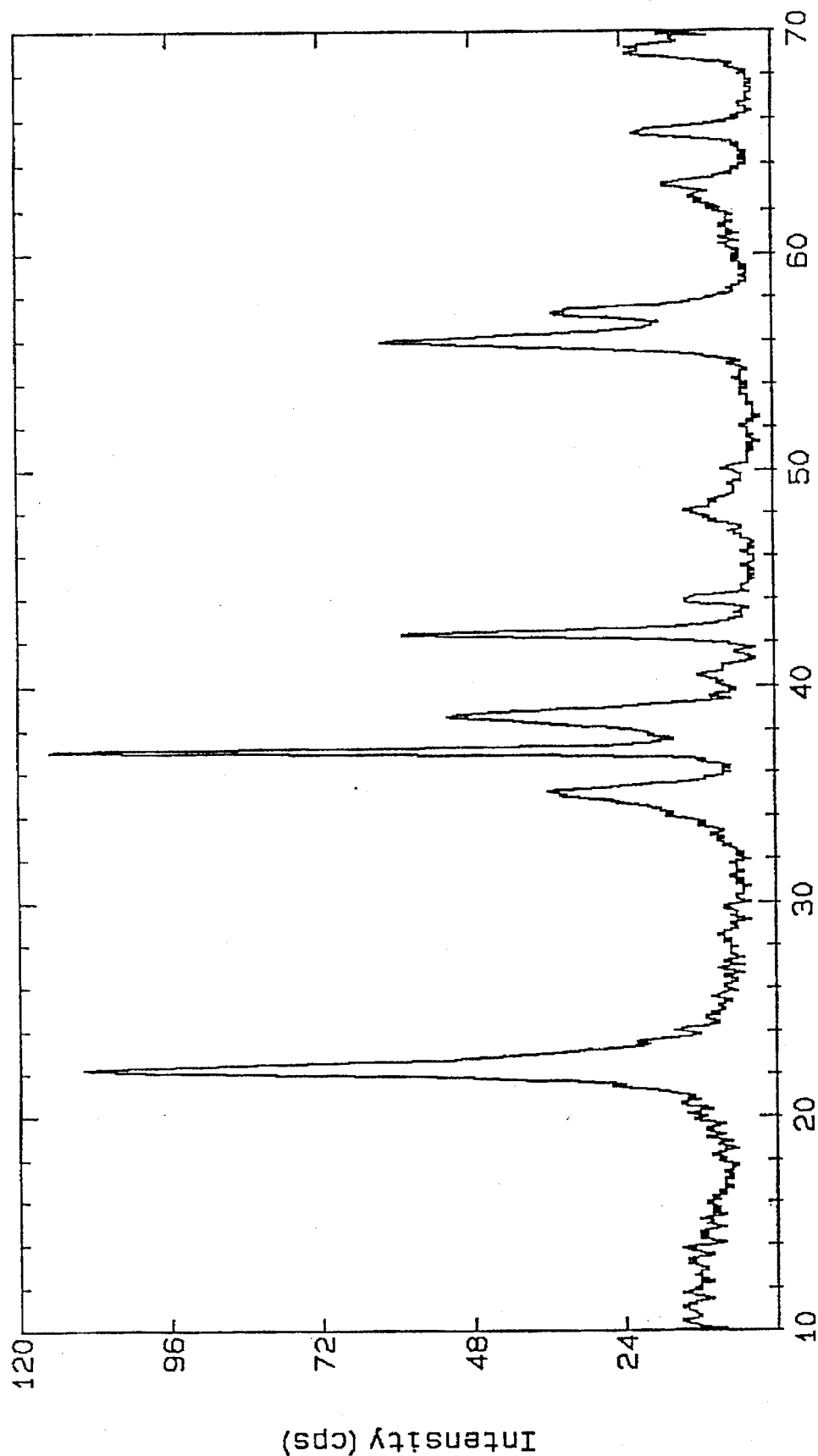
FIG. 3 shows the powder x-ray diffraction pattern after heating the product of FIG. 2.

Stoichiometric spinel $LiMn_2O_4$ was prepared by reaction of an intimate mixture of $Li_2CO_3$ and $MnCO_3$ in a 1:4 molar ratio at 800° C. in air for 24 hours. Thereafter the $LiMn_2O_4$ precursor product was heated under reflux in 2.6M $H_2SO_4$ at 95° C. for 2 days. The powder X-ray diffraction pattern ($CuK_\alpha$ radiation) of the resulting ramsdellite-$MnO_2$ product is shown in FIG. 2. After drying the product at 100° C. overnight the [$H^+$] concentration was 0.16% by weight indicative of some residual water on the surface and occluded water in the structure. After heating the ramsdellite product to 250° C., there was no significant change to the powder X-ray diffraction pattern (FIG. 3) which was indicative of the structural integrity of the ramsdellite phase at this temperature. The hydrogen content [$H^+$] of the ramsdellite product heated at 250° C. was 0.08% by weight.

Figure 4:
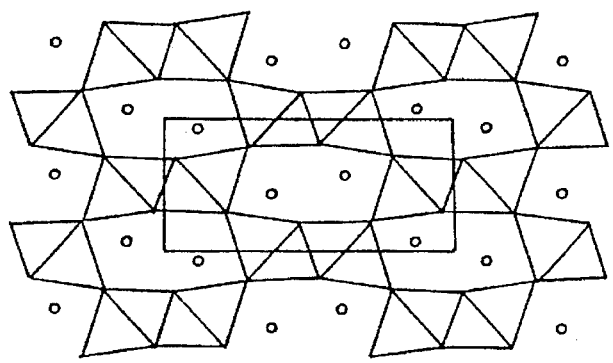
FIG. 4 shows the structure of a ramsdellite $MnO_2$ phase of the invention.

The high degree of crystallinity of the ramsdellite-$MnO_2$ phase of this invention compound is reflected by the relatively sharp peaks, and particularly by the sharp and intense [110] peak at about 22°2θ which has a relative peak height of approximately 1.0:1.0 compared to the [201] peak at about 37°2θ, and approximately 1.4:1.0 compared to the [221] peak at about 56°2θ. The ratio of the peak heights of [110]:[201] and [110]:[221] should thus, for highly crystalline ramsdellite-$MnO_2$ in accordance with the invention, preferably be >0.6:1.0 and >1.2:1.0 respectively as hereinbefore described. Furthermore, the [110] peak has a peak width, at half the peak height, of less than 2°2θ which is further indicative of the high degree of crystallinity of the ramsdellite $MnO_2$ phase of the invention compound. The structure of the ramsdellite $MnO_2$ phase as determined from a profile-refinement of this X-ray pattern is shown in FIG. 4. The refinement shows that approximately 10% of the manganese ions, as represented by the o in FIG. 4, are located in the (2×1) channels. This feature may also be attributed to a small amount of intergrown $\beta$-$MnO_2$ in the structure.

Figure 6:
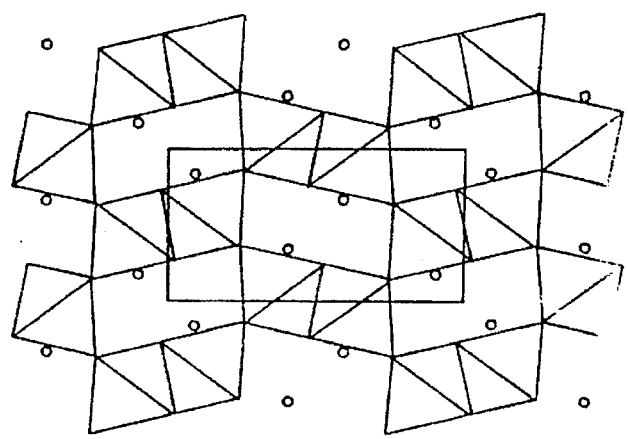
FIG. 6 shows the structure a modified ramsdellite $MnO_2$ phase of the invention.
Figure 5:
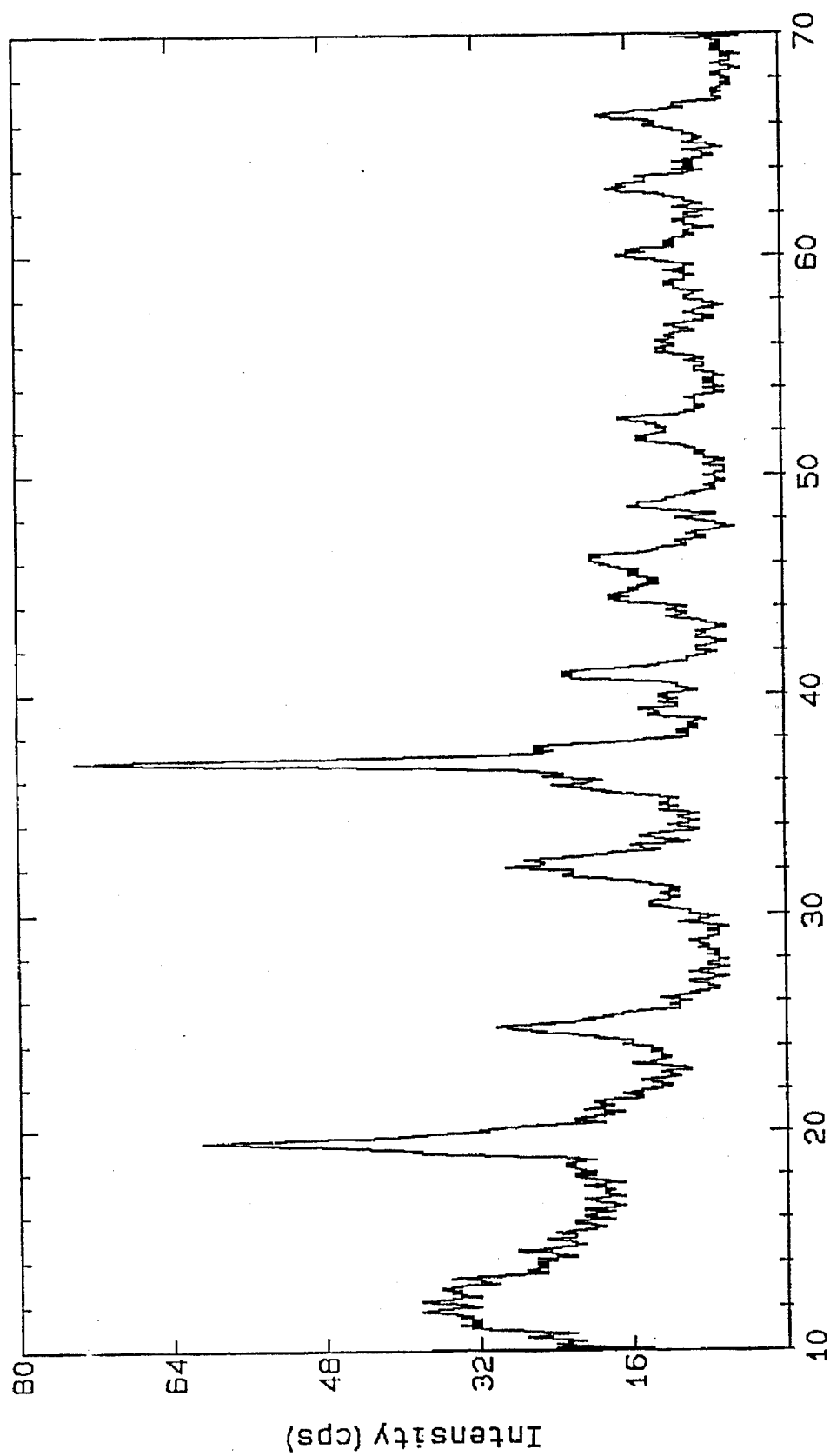
FIG. 5 shows powder x-ray diffraction pattern of a lithiated product of composition $Li_{0.5}MnO_2$.

Lithium insertion into the ramsdellite phase was demonstrated by reacting one mole equivalent of n-butyllithium in hexane with the ramsdellite-$MnO_2$ at 45° C. for 4 days. The powder X-ray diffraction pattern of the lithiated product of composition $Li_{0.5}MnO_2$ is shown in FIG. 5. The appearance of several new peaks and the significant shift of certain peaks, for example, the [110] peak at about 22°2θ to about 19.5°2θ is indicative of a modified ramsdellite structure and an expanded unit cell. The retention of the sharp, well resolved peaks, for example, the [110] and [201] peaks indicates that the lithiated phase retains a high degree of crystallinity even after reaction with a strong reducing agent such as n-butyllithium. The modified ramsdellite structure as determined by a profile-refinement of the X-ray diffraction pattern is shown in FIG. 6. It shows that lithium insertion is accompanied by a buckling of the oxygen planes and a shear of these planes from hexagonal close-packing towards a cubic-close-packed structure.

A crystallographic analysis of the product of FIG. 2 by profile analysis of the X-ray diffraction pattern, indicated that the product was an almost pure ramsdellite phase having an orthorhombic unit cell with lattice constants a=9.376 Å, b=4.471 Å and c=2.855 Å. The partially lithiated phase $Li_{0.5}MnO_2$, the X-ray pattern of which is shown in FIG. 5, was determined to have lattice constants a=9.527 Å, b=5.059 Å and c=2.848 Å.

Example 2

Figure 7:
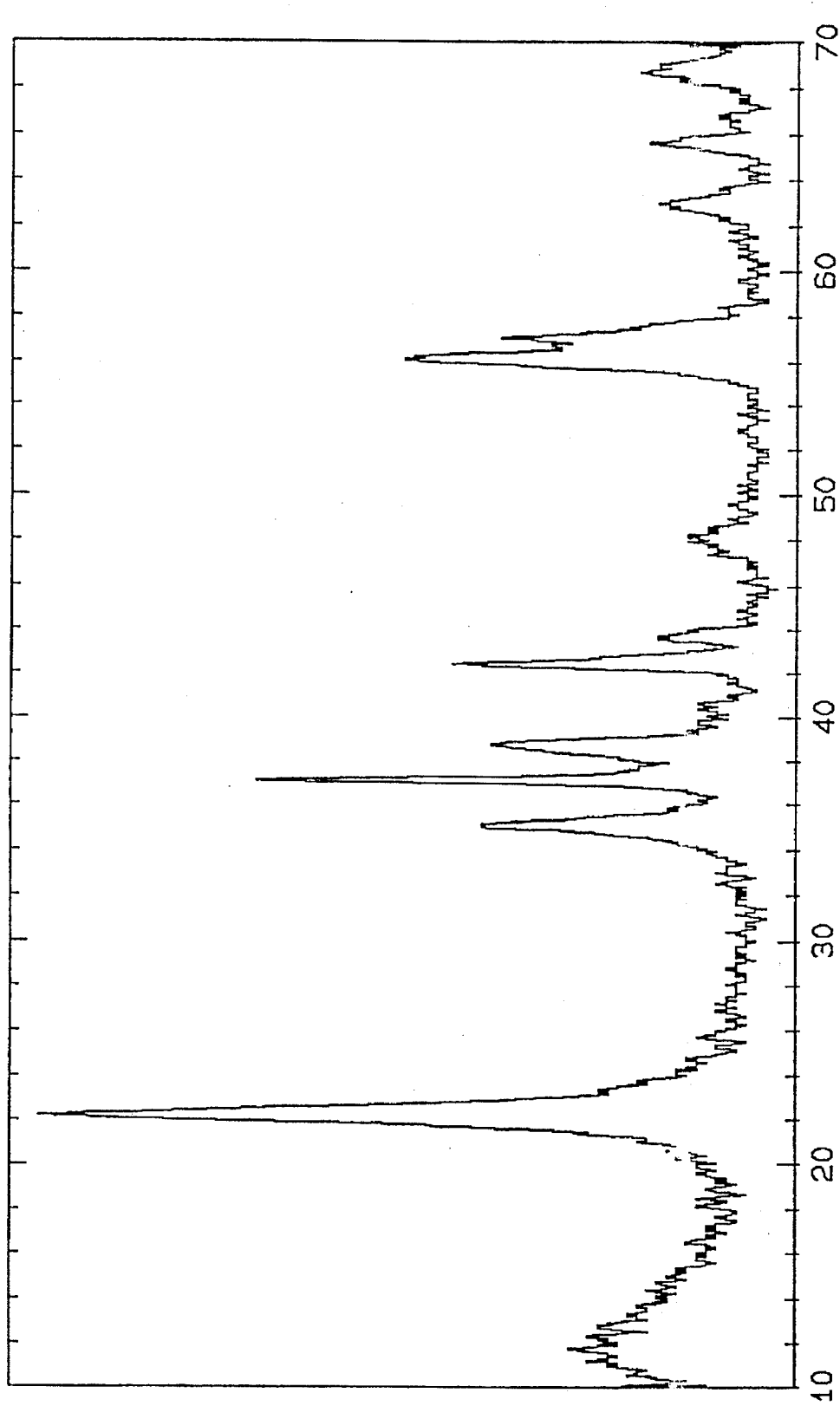
FIG. 7 shows the powder x-ray diffraction pattern of a product according to Example 2.

Defect spinel $Li_2Mn_4O_9$ ($Li_2O.4MnO_2$) was prepared by reaction of an intimate mixture of $Li_2CO_3$ and $MnCO_3$ powders in a 1:4 molar ratio at 400° C. in air for 20 hours. Thereafter, the $Li_2Mn_4O_9$ precursor product was heated under reflux in 2.6M $H_2SO_4$ at 95° C. for 2 days. The powder X-ray diffraction pattern of the resulting product is shown in FIG. 7; it is very similar to the product of Example 1 (FIG. 2).

Example 3

Figure 8:
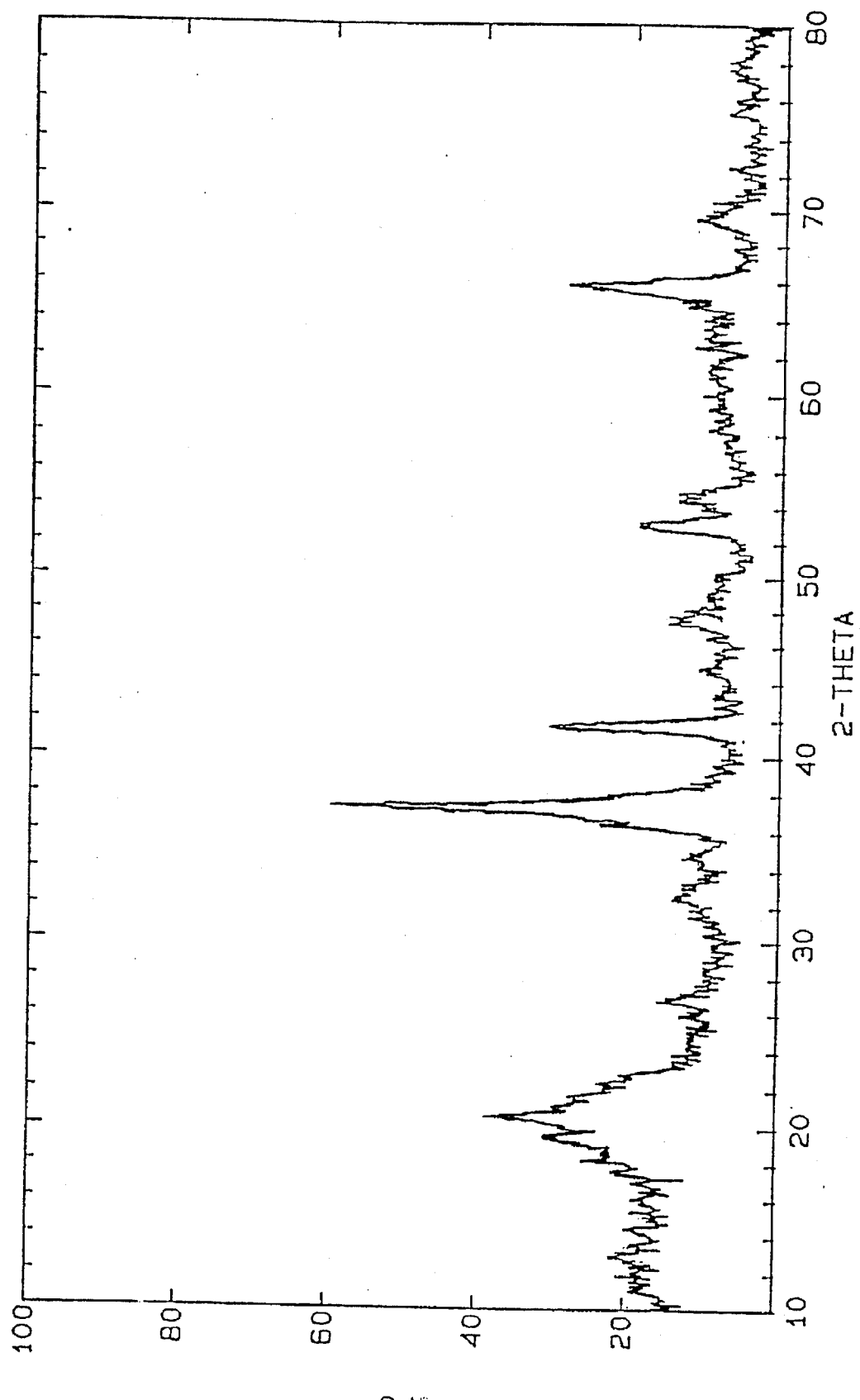
FIG. 8 shows the powder x-ray diffraction pattern of a product according to Example 3.

Ramsdellite-$MnO_2$ was reacted in air with $LiNO_3$ at 280° C. for 30 hours, and thereafter at 300° C. for 20 hours. The Li:Mn ratio in the starting mixture was 3:7. The powder X-ray diffraction pattern of the product is shown in FIG. 8. The major peaks of the X-ray diffraction pattern can be attributed to a $Li_{2x}MnO_{2+x}$ product with an orthorhombic unit cell having a=9.268Å, b=4.971 Å and c=2.864 Å.

Example 4

The product of Example 1, heated to 100° C. overnight to remove water from the sample was evaluated as a cathode material in lithium cells, similar to the cell 10 of FIG. 1. The cells were comprised of a metallic lithium anode 12, compacted onto a stainless steel current collector, an electrolyte 14 comprising 1M $LiClO_4$ dissolved in propylene carbonate and dimethoxyethane in a 1:1 ratio by volume, and a cathode 16 containing approximately 40 mg $MnO_2$ mixed with approximately 10 mg of a teflon binder/acetylene black mixture in which the teflon acts as a binding agent and the acetylene black as a current collector; the teflon:acetylene black ratios in these mixtures was 1:2.

Figure 9:
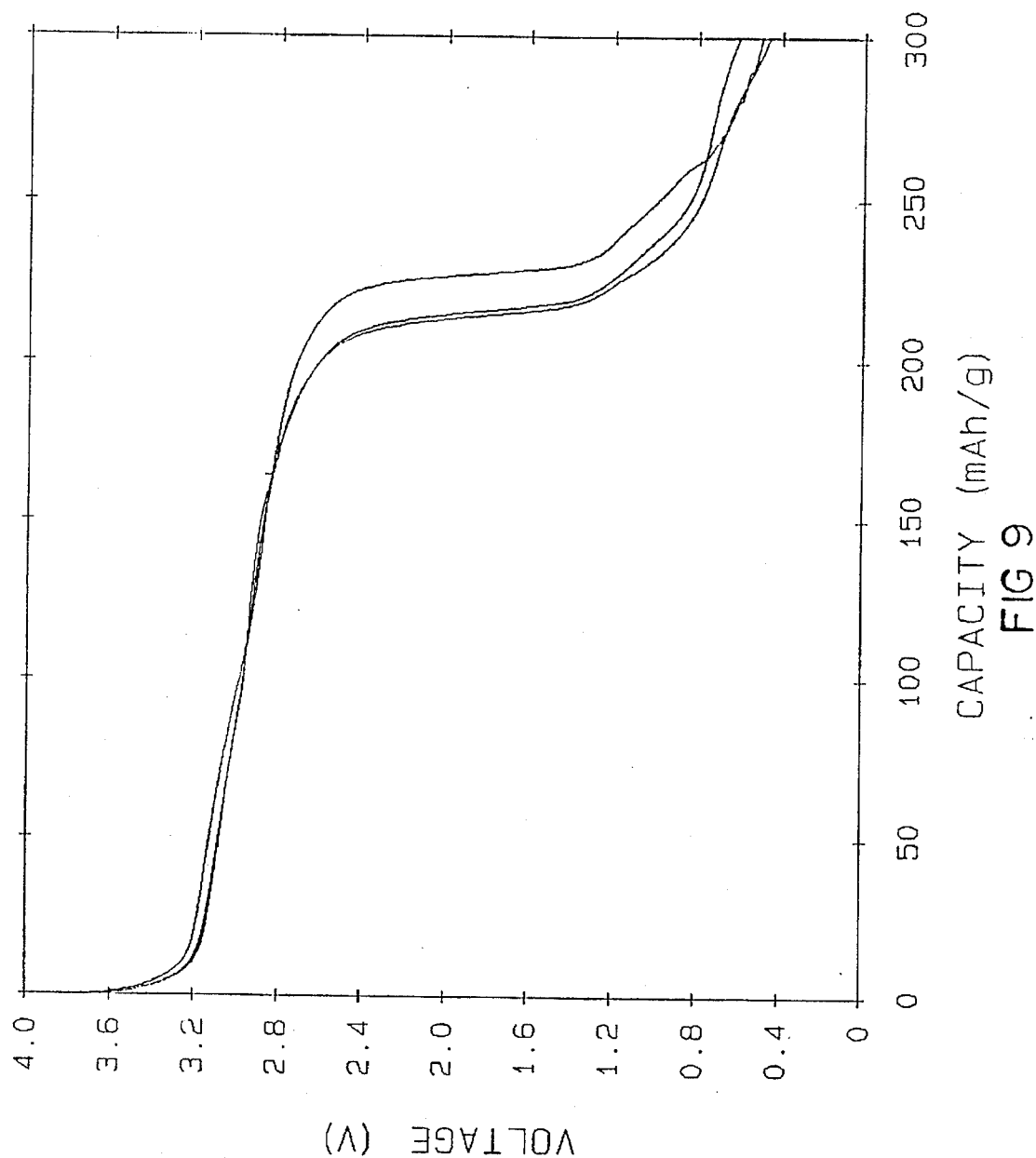
FIG. 9 shows the initial discharge curves of three independent lithium cells in accordance with the invention.
Figure 10:
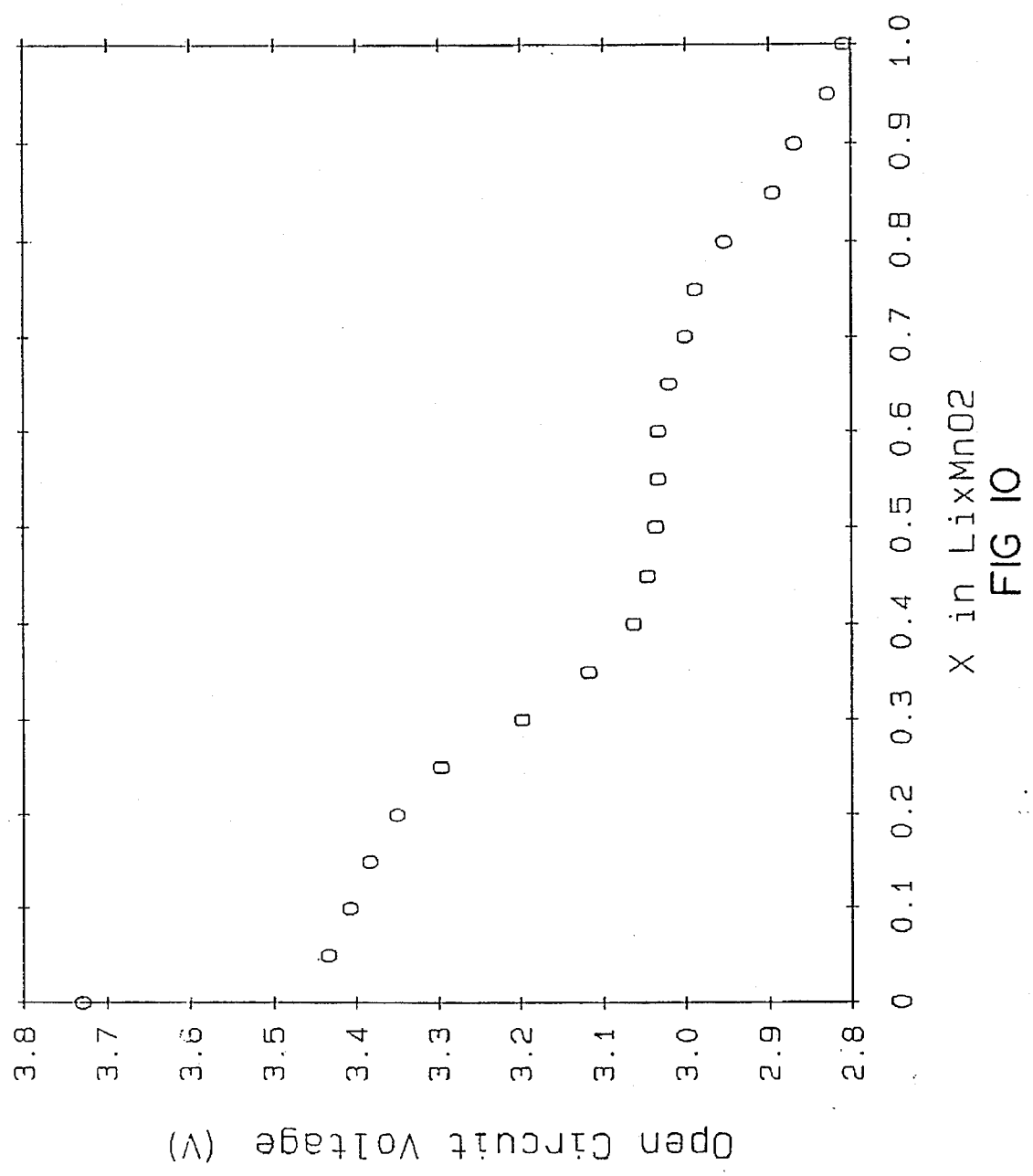
FIG. 10 shows a graph plotting open circuit voltage against the amount of lithium in $Li_xMnO_2$.

The initial discharge curves of three independent lithium cells in accordance with the invention are given in FIG. 9, which thus demonstrates that the ramsdellite phase operates as an effective cathode material, yielding, on average, approximately 225 mAh/g capacity on the initial discharge, to a cut-off voltage of 2 V. The open-circuit voltage vs composition x, in $Li_xMnO_2$ shows that ramsdellite-$MnO_2$ can accommodate one $Li^+$ to a cut-off voltage of 2.8 V, as shown in FIG. 10.

Figure 11:
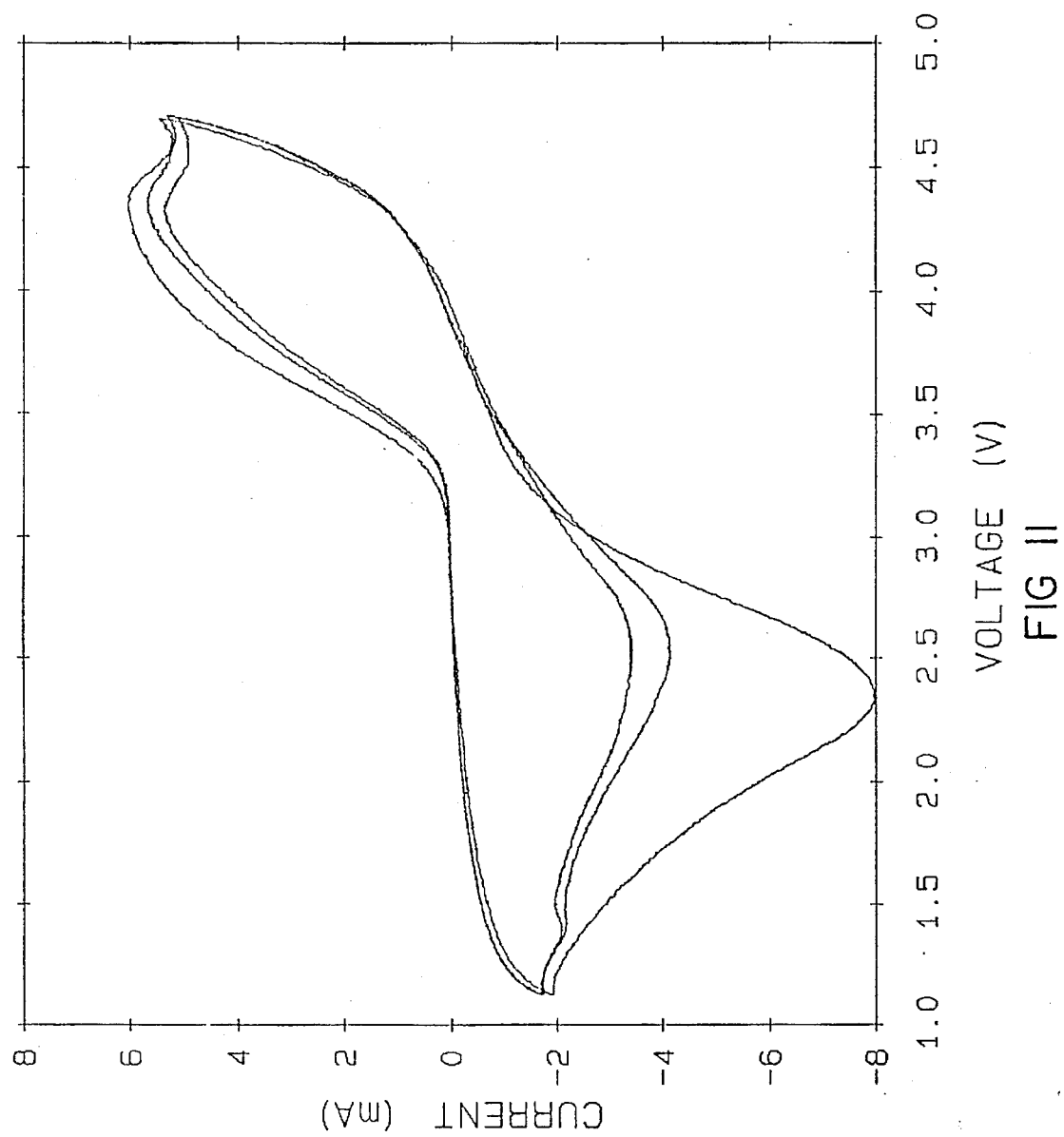
FIG. 11 shows a cyclic voltammogram the ramsdellite-$MnO_2$.

A cyclic voltammogram of the ramsdellite-$MnO_2$ swept over the voltage range 1.1 V to 4.6 V at a scan rate of 1 mV/sec (FIG. 11) demonstrates that the electrochemical reaction is reversible after the initial discharge cycle.

Figure 12:
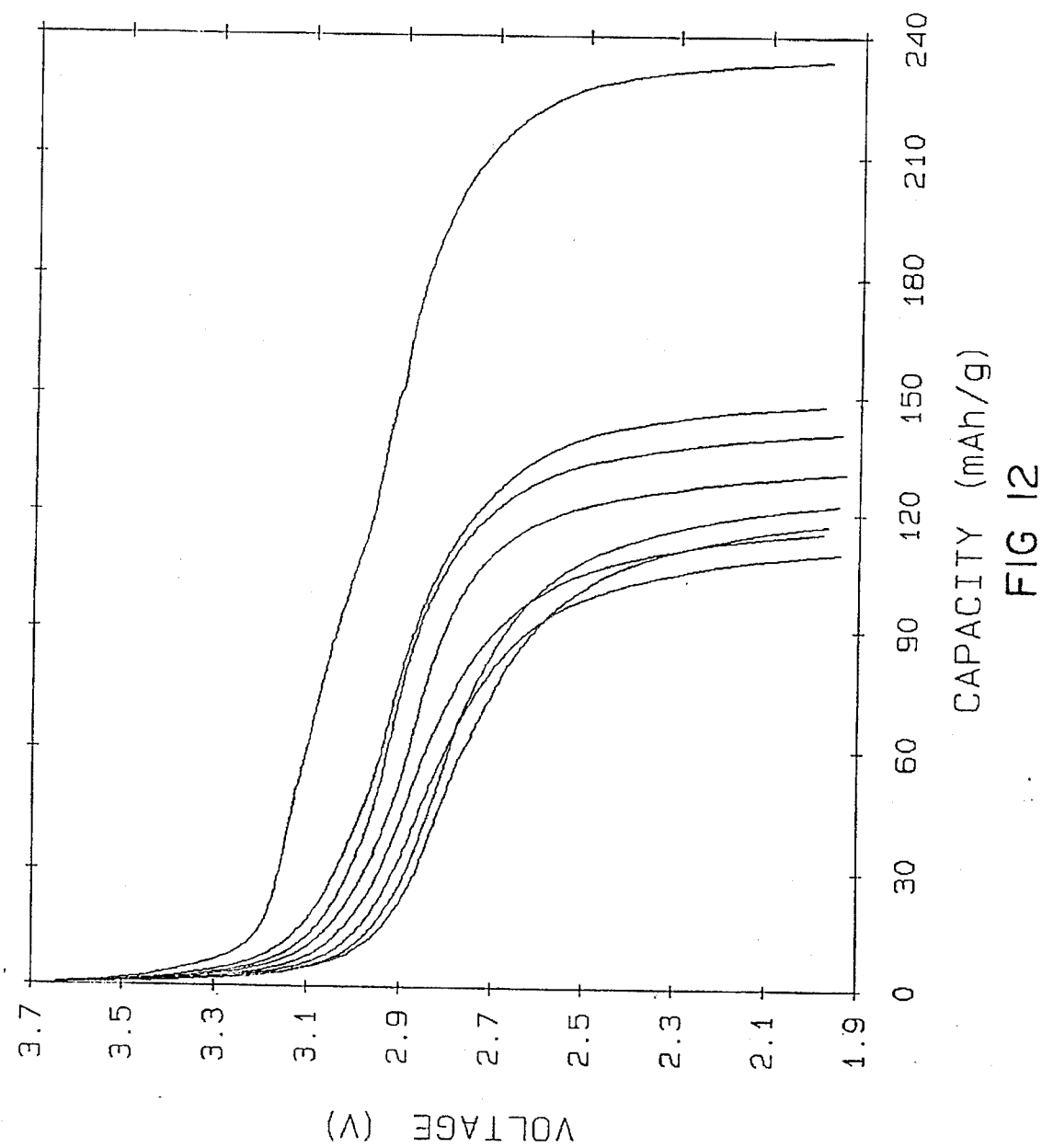
FIG. 12 shows the electrochemical discharge curves for the first 8 cycles of a rechargeable Li/ramsdellite-$MnO_2$ cell.

The electrochemical discharge curves for the first 8 cycles of a rechargeable Li/ramsdellite-$MnO_2$ cell are shown in FIG. 12 which confirms the cyclic voltammetry data and that after the initial discharge, the cell yields a rechargeable capacity between 100 and 150 mAh/g.

Example 5

Figure 13:
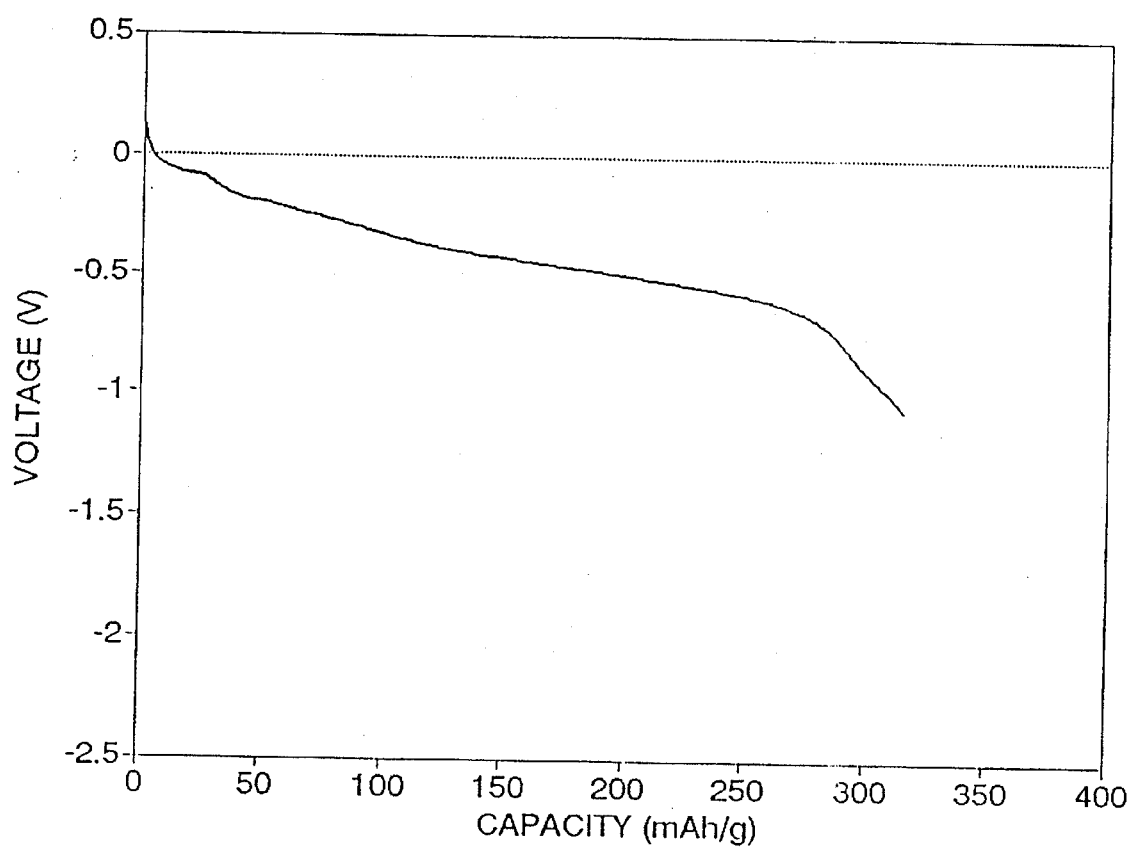
FIG. 13 shows a graph plotting capacity vs. voltage of a half cell containing the ramsdellite-$MnO_2$ of Example 5.

The ramsdellite-$MnO_2$ phase prepared by the method of Example 1, but not heat-treated, was evaluated in an alkaline half-cell using a nickel gauze counter electrode (anode), an electrolyte of 9M KOH and a Hg/HgO reference electrode. The cathode consisted of 500 mg ramsdellite-$MnO_2$ mixed with 100 mg graphite. The half cell was discharged at a current rate of approximately 10 mA (FIG. 13). The voltage obtained from this electrode was satisfactory, while the theoretical discharge capacity (308 mAh/g) could be obtained on discharge to −1V vs Hg/HgO, corresponding to the formation of MnOOH.

A particular advantage of the invention is that it provides a lithium cell potentially suitable for primary or rechargeable use, of simple design, low cost and good shelf life.

Figure 14:
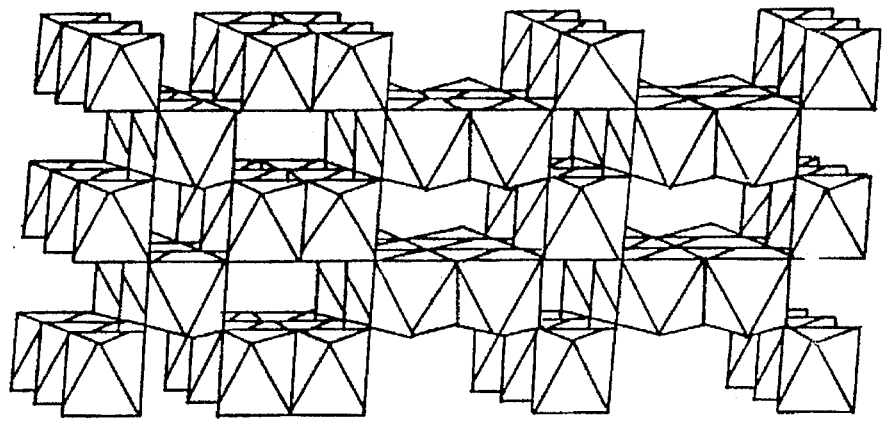
FIG. 14 shows the structure of a γ-$MnO_2$.
Figure 15:
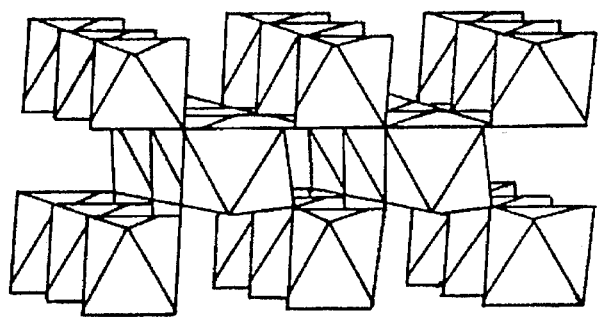
FIG. 15 shows the structure of a rutile-type β-$MnO_2$.
Figure 16:
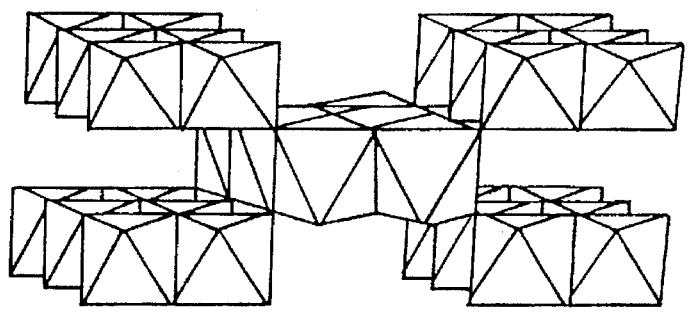
FIG. 16 shows the structure of a ramsdellite-type $MnO_2$.

Manganese dioxide is well known as a cathode material for an electrochemical cell using either zinc or lithium anodes, with an electronically insulating electrolyte separating the anode from the cathode. The most common form of manganese dioxide used thus far is $\gamma$-$MnO_2$, which can be prepared either chemically, ie chemical manganese dioxide ('CMD'), or electrolytically, ie electrolytic manganese dioxide ('EMD'). $\gamma$-$MnO_2$ (FIG. 14) has a structure which may be regarded as an intergrowth of a rutile-type $MnO_2$ structure ($\beta$-$MnO_2$) (FIG. 15) and a ramsdellite-type $MnO_2$ (FIG. 16). Both CMD and EMD contain surface and occluded water which assists the electrochemical discharge reaction when they are used as cathodes in aqueous zinc battery systems. However, this surface and occluded water, which is believed to be located predominantly at grain boundaries, must be removed from the manganese dioxide electrode material when employed in lithium cells as lithium reacts vigorously with water. Heat treatment of $\gamma$-$MnO_2$ to 350°–450° C. which removes approximately 80% of the water, but not all the water, also causes a transformation of the structure to what is termed a $\gamma/\beta$-$MnO_2$ phase, ie one in which the rutile (or $\beta$-$MnO_2$) component in the structure is increased.

Rutile-$MnO_2$ contains unidimensional channels with a cross-section defined by the size of one $MnO_6$ octahedron; the channels can thus be defined as (1×1) channels. The channels in ramsdellite are also unidimensional, but the cross-section of the each channel is defined by two $MnO_6$ octahedra in one direction and by a single $MnO_6$ octahedron in an orthogonal direction so that the channels can be defined as (2×1) channels.

Electrochemical reactions of lithium batteries which use transition metal oxides or chalcogenide cathodes most often occur by insertion or topochemical reactions whereby lithium is inserted into the host transition metal oxide/chalcogenide structure with a concomitant reduction of the transition metal of the host.

Hence, $\beta$-$MnO_2$ with narrow unidimensional channels is not as electrochemically active as $\gamma$-$MnO_2$ which contains both $\gamma$-$MnO_2$ type (1×1) channels and larger ramsdellite type (2×1) channels. It has been found that a crystalline $\beta$-$MnO_2$ product takes up only 0.2 $Li^+$ per $MnO_2$ unit whereas heat-treated $\gamma/\beta$-$MnO_2$ with both ramsdellite and rutile channels incorporates substantially more $Li^+$ ions per formula unit. In particular, it has been found that heat-treated $\gamma/\beta$-$MnO_2$ reacts with one $Li^+$ per $MnO_2$ unit, but this is not fully reversible which limits the application in rechargeable lithium cells.

Thus, the greater the ramsdellite fraction in $\gamma$-$MnO_2$, the greater the capacity for lithium uptake in the electrode material, and hence the greater the recharging capacity of the electrode material. Since the electrode material of the present invention can be synthesized in virtually anhydrous form, relatively high temperatures which are required for moisture removal and which converts part of the structure into the undesirable $\beta$-$MnO_2$ phase as hereinbefore described, are not required. Furthermore, the desired stability of the ramsdellite structure can be induced by reaction of a lithium salt in a minor concentration with the ramsdellite-$MnO_2$, as hereinbefore described.

Figure 17:
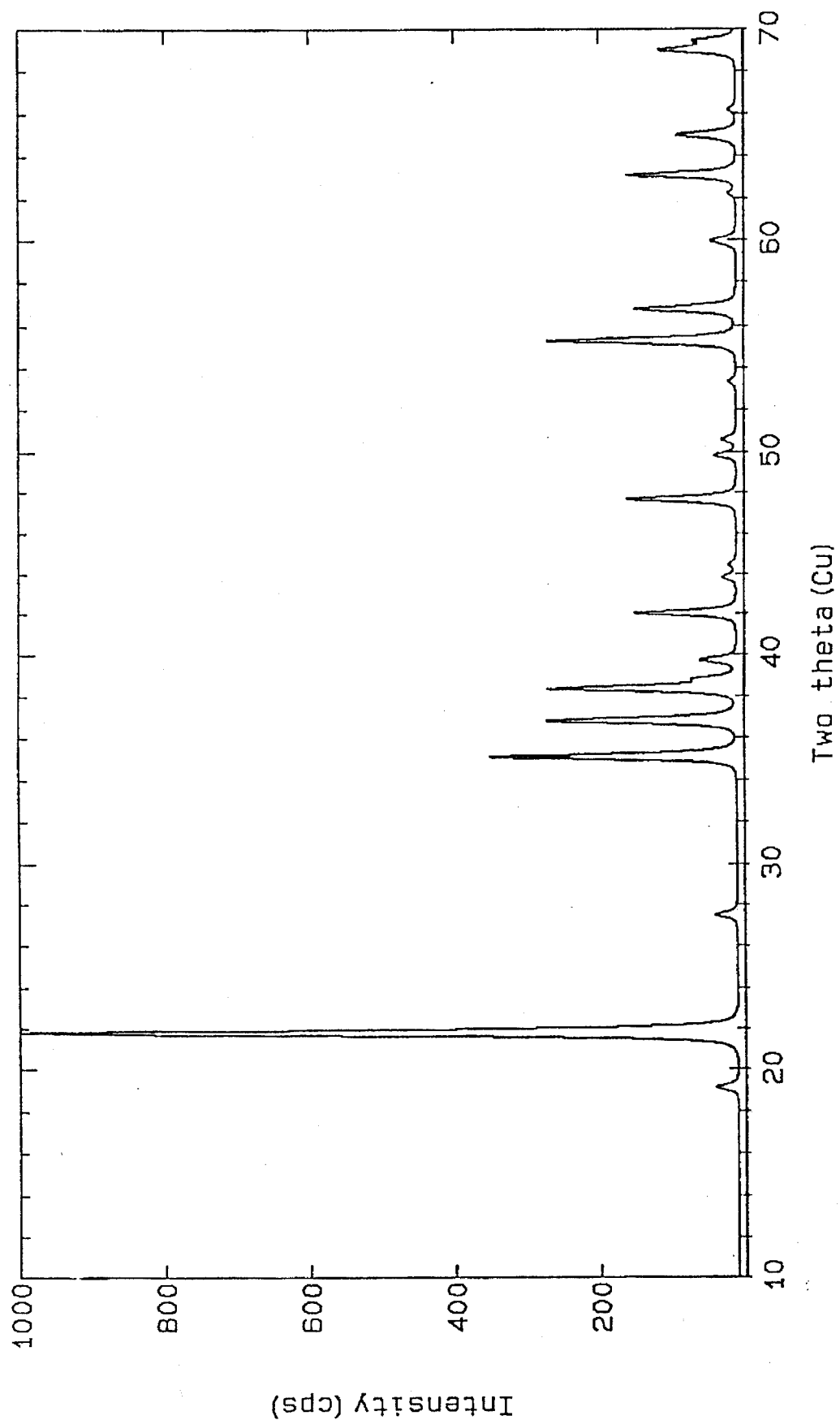
FIG. 17 shows a Simulated powder x-ray diffraction pattern of an ideal ramsdellite $MnO_2$ structure.

A simulated powder X-ray diffraction pattern of an ideal ramsdellite $MnO_2$ structure is given in FIG. 17.

Ramsdellite-$MnO_2$ has a distorted hexagonally-close-packed ('hcp') oxygen anion array. In such an arrangement, the octahedra defined by the oxygen lattice share edges with one another, whereas others share faces. In ramsdellite-$MnO_2$ it is therefore unlikely that all the interstitial octahedral sites of the structure can be filled by inserted lithium ions at any one time because of electrostatic interactions of the cations in the face-shared octahedra. It is therefore believed that in ramsdellite-$MnO_2$ only a small fraction of the interstitial sites can become filled by lithium ions before the oxygen-ion array is transformed towards cubic-close-packing to yield a modified structure which is inherently more stable than the original distorted hexagonally-close-packed parent structure.

It has also been demonstrated that, after the first discharge, not all the lithium ions can easily be removed from the structure on charging the cell, and that a minor concentration of $Li^+$ ions remain in the channels of the modified ramsdellite phase to stabilize the structure.

We claim:

1. A chemical manganese dioxide consisting essentially of single phase ramsdellite, and having powder x-ray diffraction pattern (CuK alpha radiation) in which the ratio of a (110) peak height to a (201) peak height is at least 0.6:1.0, and which includes a minor proportion of lithium or hydrogen to stabilize the ramsdellite structure.

2. An electrochemical cell, which comprises an electronically conducting anode;

an electronically conducting cathode comprising a chemical manganese dioxide which consists essentially of single phase ramsdellite, and has a powder x-ray diffraction pattern (CuK$_\alpha$ radiation) in which the ratio of a (110) peak height to a (201) peak height is at least 0.6:1.0, the ratio of the (110) peak height to a (221) peak height is at least 1.2:1.0, the (110) peak height has a peak width, at half the peak height, of less than 2°2θ, and which has (221) and (420) peaks present as a doublet at about 56°2θ; and an electronically insulating electrolyte separating the anode from the cathode.

3. A chemical manganese dioxide, consisting essentially of single phase ramsdellite, and having powder x-ray diffraction pattern (CuK$_\alpha$ radiation) in which the ratio of a (110) peak height to a (201) peak height is at least 0.6:1.0, the ratio of the (110) peak height to a (221) peak height is at least 1.2:1.0, the (110) peak height has a peak width, at half the peak height, of less than 2°2θ, and, which has (221) and (420) peaks present as a doublet at about 56°2θ.

4. A material according to claim 3 wherein, in the powder X-ray diffraction pattern, the ratio of the (110) peak height to the (221) peak height is about 1.4:1.0.

5. A material according to claim 3, wherein the ramsdellite has as an impurity a minor proportion of $\beta$-$MnO_2$ as an intergrowth with the ramsdellite.

6. A material according to claim 3, which further consists essentially of a minor proportion of lithium or hydrogen to stabilize the ramsdellite structure, the Mn:O ratio of the ramsdellite $MnO_2$ deviating slightly from 1:2 such that the oxidation state of the manganese ions is less that 4.0 but greater than 3.5.

7. A material according to claim 3 wherein, in the powder X-ray diffraction pattern, the ratio of the (110) peak height to the (201) peak height is at least 0.8:1.0.

8. A material according to claim 7 wherein, in the powder X-ray diffraction pattern, the ratio of the (110) peak height to the (201) peak height is about 1.0:1.0.

9. A material according to claim 3 which, when reacted with a lithium salt, generates lithium-stabilizing phases which can collectively be represented by $Li_{2x}MnO_{2+x}$, wherein X is greater than or equal to 0 and less than or equal to approximately 0.2.

* * * * *